Oct. 4, 1966  S. L. WILSON ETAL  3,276,214
CRYOGENIC LIQUID LEVEL CONTROL DEVICES
Filed Feb. 5, 1965  2 Sheets-Sheet 1

INVENTORS.
STANLEY L. WILSON
CARLOS C. RODRIGUEZ
BY Barnwell P. King
ATTORNEY

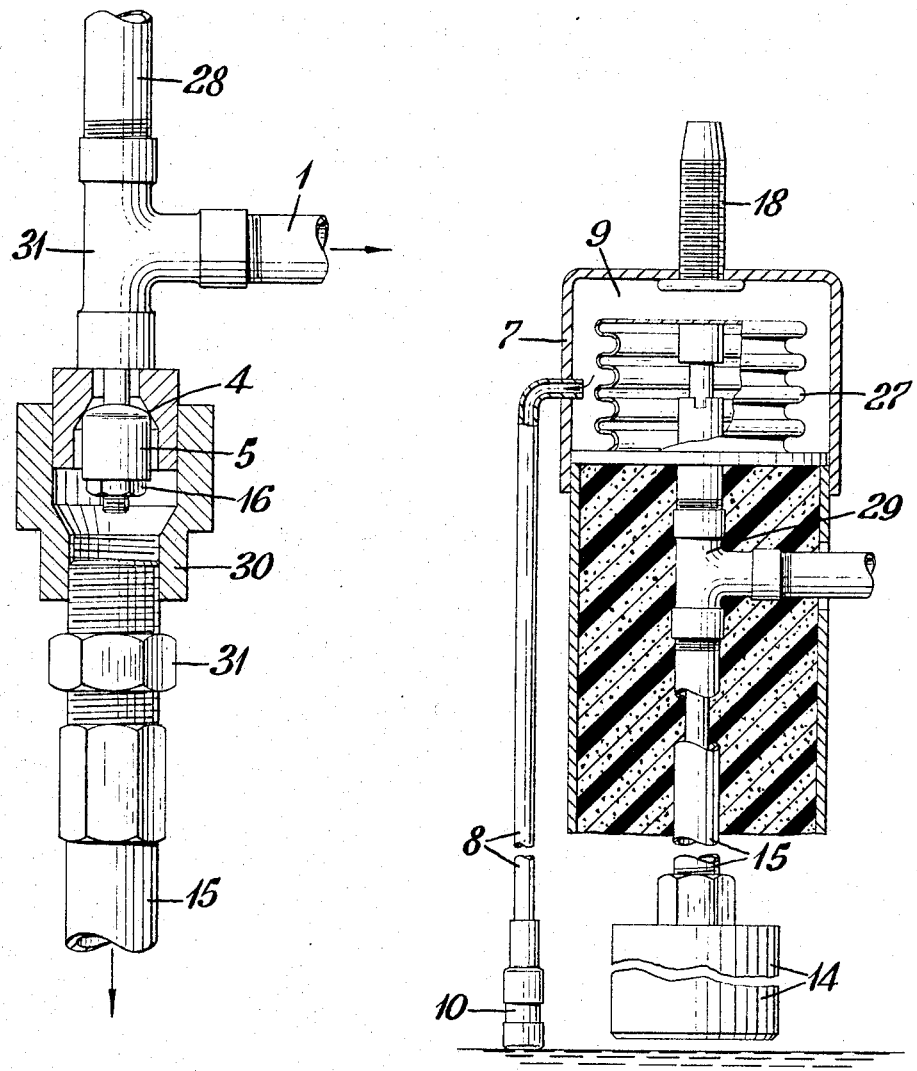

3,276,214
CRYOGENIC LIQUID LEVEL CONTROL DEVICES
Stanley L. Wilson, Tonawanda, N.Y., and Carlos C. Rodriguez, Pacific Palisades, Calif., assignors to Union Carbide Corporation, a corporation of New York
Filed Feb. 5, 1965, Ser. No. 430,548
2 Claims. (Cl. 62—49)

This invention relates to cryogenic liquid level control devices, and more particularly to the non-electric gas condensation single probe type.

The invention provides a cryogenic liquid level controller comprising the combination of a cryogenic liquid supply conduit provided with a shut-off valve for delivering a cold liquid such as nitrogen to an insulated container, a gas filled probe depending into such container, and a gas pressure responsive bellows connected directly to said shut-off valve for opening it when the level of such liquid falls below said gas-filled probe. The interior of the probe communicates with the bellows so that when such liquid level reaches the probe, the gas therein is chilled, causing condensation and a drop in the pressure acting on the bellows, which thereupon closes the shut-off valve.

The controller of the invention preferably is insulated, and undesirable spraying and splashing of the liquid as it is delivered to the container is prevented preferably by a phase separator.

The principal advantages of the present liquid level control device is that it is not dependent on externally supplied power, does not require any external connections, and is a self-contained unit. It is also capable of maintaining liquid levels quite accurately. Also, no packing gland arrangement is required.

In the drawings:

FIGURE 2 is an enlarged fragmentary view partly in elevation and partly in section of the inlet valve; and FIGURE 3 is a similar view, mainly of the bellows.

Figure 1:
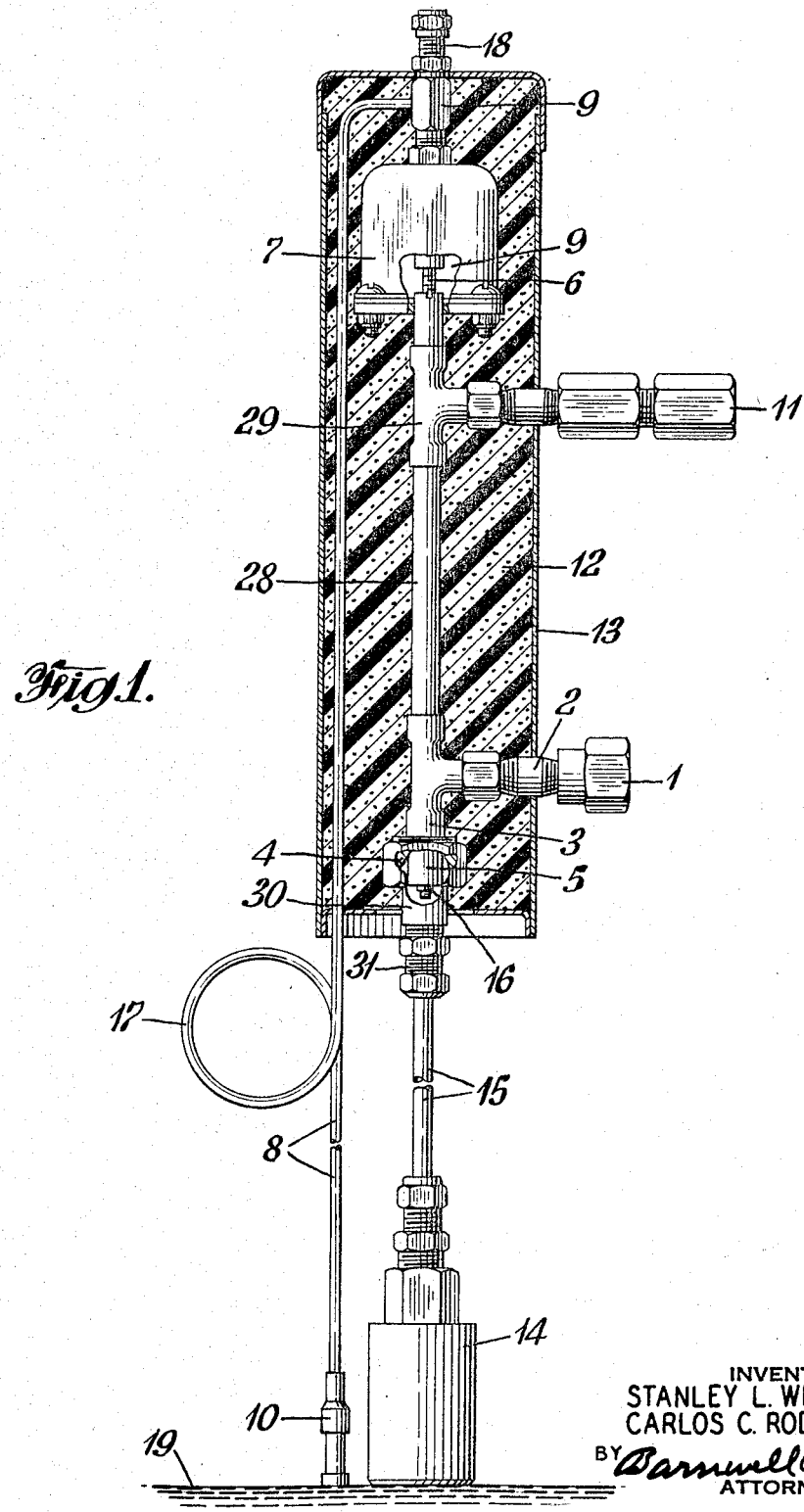
FIGURE 1 is a fragmentary view partly in elevation and mainly in section of a liquid level control device illustrating the invention.

As shown in the drawings, a cold fluid such as liquid nitrogen enters through connection 1 and flows through tubes 2 and 3 to outlet seat 4, which is closeable by a valve 5 which moves against seat 4. The position of valve 5 relative to seat 4 is controlled by rod 6 mechanically connected to gas-pressure-operated bellows 27 in a housing 7 located at the upper end of the device. The inner side of bellows 27 is exposed to the upstream or supply pressure from connection 1 by way of pipe 28.

Bellows 27 is movable in response to gas pressure changes in a gas-filled tubular probe 8 which is connected to a pressure-tight cavity 9 in the housing around bellows 27. Tubular probe 8 is provided at its end with a bulb 10 which is brought into contact with the liquid whose level is to be controlled. The bulb 10 has a relatively low heat capacity and good thermal conductivity.

To protect the bellows from excessive internal pressure, a pressure relief device 11, set at a desired pressure level is connected to the pipe 28 by a T-fitting 29, as shown. Also, particularly for low-boiling fluids such as liquefied gases, the valve is insulated with plastic foam 12 enclosed by a metal casing 13. Spraying and splashing of easily vaporizable fluids when discharged from the controller are substantially prevented by a phase separator 14 surrounding the outlet at the lower end of tubing 15 that is connected to valve fitting 30 by coupling 31.

Valve 5 is adjustably attached to rod 6 by an "elastic stop" nut 16. Thus, the degree of opening of valve 5 may be adjusted by nut 16 in relation to the pressure required within probe 8 and around bellows 27—depending upon the spring rate of the bellows. The maximum movement of the bellows is restricted by a suitable stop.

The tubes 8 and 15 permit flow to be directed into remote or inaccessible locations, and may be coiled as at 17 to provide flexibility in adjusting the level of probe bulb 10 to the desired level which is to be controlled. A tire valve 18 is provided at the upper end of the unit for aid in purging and/or filling the bellows assembly and probe with selected gas at the desired pressure level.

Bellows 27 may, if desired, be of the differential type.

In operation, when the level of liquid 19, nitrogen for example, falls below the desired level, the gas in probe 8 contracts, causing the bellows 27 to open valve 5. This results in liquid flowing through tubing 15 and phase separator 14 until the desired level is reached, whereupon the gas in probe end 10 condenses causing a pressure decrease in cavity 9 which, in turn, expands bellows 27 and closes valve 5 shutting off the flow of liquid at the selected level.

What is claimed is:

1. A cryogenic liquid level control device comprising in combination: a liquid supply conduit provided with a shut-off valve for delivering a cryogenic liquid to a container, a gas-pressure responsive bellows, means connecting said bellows directly to said valve, a gas-filled probe in gas communication with said bellows, and means sealing gas within said probe and adjacent said bellows, one end of said probe being located adjacent the desired liquid level for changing the pressure of such gas to operate said bellows and, in turn, close said valve in response to condensation of such gas when the level of such cryogenic liquid reaches such end of said probe and changes the temperature of the gas therein to produce condensation.

2. A device as claimed by claim 1, in which the outlet of said valve is provided with a phase separator to prevent spraying and splashing of the liquid delivered thereby to the container when called for by said probe.

References Cited by the Examiner

UNITED STATES PATENTS

| | | | |
|---|---|---|---|
| 2,619,107 | 11/1952 | Graham | 137—393 |
| 2,780,921 | 2/1957 | Morrison | 62—45 |
| 3,195,620 | 7/1965 | Steinhardt | 62—45 X |
| 3,199,303 | 8/1965 | Haumann et al. | 62—49 X |

LLOYD L. KING, *Primary Examiner.*